United States Patent [19]

Ofek

[11] Patent Number: 6,092,066
[45] Date of Patent: *Jul. 18, 2000

[54] METHOD AND APPARATUS FOR INDEPENDENT OPERATION OF A REMOTE DATA FACILITY

[75] Inventor: Yuval Ofek, Hopkinton, Mass.

[73] Assignee: EMC Corporation, Hopkinton, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/656,035

[22] Filed: May 31, 1996

[51] Int. Cl.⁷ .................................................. G06F 17/30
[52] U.S. Cl. ............................................. 707/10; 707/204
[58] Field of Search .................... 707/204, 8, 10; 395/182.04, 182.13

[56] References Cited

U.S. PATENT DOCUMENTS

| | | | |
|---|---|---|---|
| 4,866,611 | 9/1989 | Cree et al. | 364/705.08 |
| 5,093,787 | 3/1992 | Simmons | 705/33 |
| 5,101,492 | 3/1992 | Schultz et al. | 395/575 |
| 5,185,884 | 2/1993 | Martin et al. | 395/575 |
| 5,206,939 | 4/1993 | Yanai et al. | 395/400 |
| 5,235,601 | 8/1993 | Stallmo et al. | 371/40.1 |
| 5,263,154 | 11/1993 | Eastridge et al. | 395/575 |
| 5,317,731 | 5/1994 | Dias et al. | 395/600 |
| 5,357,509 | 10/1994 | Ohizumi | 371/10.1 |
| 5,392,390 | 2/1995 | Crozier | 345/335 |
| 5,432,922 | 7/1995 | Polyzois et al. | 395/182.04 |
| 5,434,994 | 7/1995 | Shaheen et al. | 707/201 |
| 5,450,577 | 9/1995 | Lai et al. | 395/182.13 |
| 5,469,503 | 11/1995 | Butensky et al. | 379/265 |
| 5,495,601 | 2/1996 | Narang et al. | 395/600 |
| 5,497,483 | 3/1996 | Beardsley et al. | 395/180 |
| 5,537,533 | 7/1996 | Staheli et al. | 395/182.03 |
| 5,544,347 | 8/1996 | Yanai et al. | 711/162 |
| 5,579,318 | 11/1996 | Reuss et al. | 370/410 |
| 5,596,706 | 1/1997 | Shimazaki et al. | 395/182.04 |
| 5,615,364 | 3/1997 | Marks | 707/202 |
| 5,625,818 | 4/1997 | Zarmer et al. | 707/104 |
| 5,649,089 | 7/1997 | Kilner | 395/182.04 |
| 5,673,382 | 9/1997 | Cannon et al. | 395/182.04 |
| 5,740,397 | 4/1998 | Levy | 711/114 |

*Primary Examiner*—Maria N. Vonbuhr
*Attorney, Agent, or Firm*—George A. Herbster; Pearson & Pearson

[57] ABSTRACT

A data network with a remote data facility for providing redundant data storage and for enabling concurrent access to the data for multiple purposes. A local data processing system with a data facility stores a data base and processes transactions or other priority applications. A second system, physically separated from the first system includes the remote data facility that normally mirrors the data in the first system. In an independent access operating mode, the second system is enabled to operate on the data within its data facility concurrently with, but independently of, the operation of the first system. On completion of the independent operation, the second system reconnects with and synchronizes with the first system thereby to reestablish the mirroring operation of the second system.

27 Claims, 7 Drawing Sheets

|  | FIRST VECTOR | | SECOND VECTOR | | THIRD VECTOR | | RESULT | |
|---|---|---|---|---|---|---|---|---|
|  | M1 | M2 | M1 | M2 | M1 | M2 | M1 | M2 |
| 100 | 0 | 0 | 0 | 0 | 0 | 0 | 0 | 0 |
| 101 | 0 | 0 | 1 | 0 | 0 | 1 | 0 | 1 |
| 102 | 0 | 1 | 0 | 0 | 0 | 0 | 0 | 1 |
| 103 | 0 | 1 | 1 | 0 | 0 | 1 | 0 | 1 |

FIG. 7

METHOD AND APPARATUS FOR INDEPENDENT OPERATION OF A REMOTE DATA FACILITY

BACKGROUND OF THE INVENTION

1. Field of the Invention

This invention generally relates to digital data processing systems with geographically remote mirrored systems and more particularly to such systems in which the mirrored systems are adapted for simultaneous, diverse uses such as on-line transaction application or other priority processing applications and decision support system applications that characterize data base management system operations.

2. Description of Related Art

Computer implemented data base management systems are exemplary of systems that operate with what can become two antithetical considerations, namely: (1) maintaining the integrity of the data on the system and (2) maintaining maximum availability of the data on the system. That is, in prior art systems backup operations to preserve data integrity and normal operations for using the data base were mutually exclusive operations. The considerations of data integrity and availability become antithetical when a backup operation interferes with normal operations or when normal operations, due their priority, prevent a timely backup. These conflicts become more prevalent because as the size of data bases increases the time required to complete a conventional backup operation increases. Yet it remains an ultimate goal to have continuous availability of the data base for normal operations.

The maintenance of data integrity in such systems originally involved making copies of the data on the same or other storage devices such as disk drives or on other media such as magnetic tape to provide an historical backup. Typically, however, these systems required all other operations in the data processing system to terminate while the backup was underway. More recently disk redundancy has evolved as an alternative or complement to historical backups. Generally speaking, in a redundant system two storage devices, such as disk storage devices, store data in a form that enables the data to be recovered if one storage device becomes disabled. In a basic approach, a first disk storage device stores the data and a second disk storage device stores a mirror image of that data. Whenever a transfer is made to the first disk storage device, the data transfers to the second disk storage device essentially simultaneously. Typically separate controllers and paths interconnect the two disk storage devices to the remainder of the computer system.

More recently the concept of redundancy has come to include remote data facilities. A computer system with a remote data facility will include a first data processing system with disk storage at as a local site facility and one or more duplicate data processing systems at one or more physically remote locations that operate as one or more mirrors of the data collection in the first system. The physical separation can be measured in any range between meters and hundreds or even thousands of kilometers. In whatever form, the remote data facility provides data integrity with respect to any system errors produced by power failures, equipment failures and the like.

Storage facilities using redundancy including remote data facilities have become repositories for large data bases that also are dynamic entities. They are subject to rapid change as for example in banking systems by bank teller and automatic teller machine (ATM) entries or by requests for passenger tickets in airline reservation systems. In many data base systems On-Line Transaction Processing (OLTP) applications maintain the data base in a current state while decision support system (DSS) or query applications enable individuals to obtain reports based upon the contents of the data base.

In early systems the OLTP and DSS applications ran on a mutually exclusive basis. That is, no DSS applications could run while OLTP applications were being processed. Conversely no OLTP application processing could occur while the DSS applications were in use. Certain levels of data integrity were provided to assure the validity of entry data in such systems. For example, U.S. Pat. No. 5,450,577 to Lai et al. discloses a high capacity transaction system in which integrity is assured while transaction processing is underway. In this particular approach, a system receives events from an event generator and stores the raw events to disk, the raw events corresponding, for example, to different data entries for a particular record. Structural information relating events to transactions is not stored on disk. This provides data integrity during the construction of raw events to form a transaction or record to be posted to the data base.

Referring to the issue of availability, the increase in the number of transactions posted to such data bases and the need for twenty-four hour transaction processing particularly introduced by the sheer number of transactions being processed and worldwide access has lead to a ultimate goal of continuous availability for processing OLTP applications. It is no longer acceptable to interrupt the process of OLTP applications for purposes of processing DSS applications. Yet, if this requirement were strictly construed, it would never be possible to obtain queries, so the data base would, in effect, be useless. Consequently steps have been taken to maximize the availability of a system for processing OLTP or other priority applications while still permitting the processing of DSS applications on a timely basis.

U.S. Pat. No. 5,317,731 to Dias et al. discloses one approach for providing separate processes or on-line transaction application and decision support system application processing. In this patent on-line transaction and decision support system application processing are referred to as transaction and query processing respectively. Dias et al. utilize an intelligent page store for providing concurrent and consistent access by a functionally separate transaction entity and a query entity to a shared data base while maintaining a single physical copy of most of the data. The intelligent page store contains shared disk storage. An intelligent versioning mechanism allows simultaneous access by a transaction processor and a query processor. However, the transaction processor is presented current data while the query processor is presented a recent and consistent version of the data. In this particular approach both the transaction and query processors operate independently of each other and are separately optimized. However, the query processor apparently can only read data from the intelligent page store.

U.S. Pat. No. 5,495,601 to Narang et al. discloses an alternative approach for separating on-line transaction and device systems support application processing. In this particular embodiment transactions directly effect data at a series of disks through a controller. When a decision support application is processed, a host produces a series of parameters that pass to the controller and represent the selection criteria for records in a data base. The controller then operates on the data base independently of the host to identify those records satisfying the criteria. While this occurs, the host temporarily stores any updates due to transactions in a buffer pool. The decision support system seems to be limited to read-only operations.

While the foregoing references provide alternates for maximizing the availability of a system for processing OLTP or like priority applications, they do not effect a complete segregation of those processes. These references also fail to provide any suggestions for procedures that will provide data redundancy. Moreover the processing of decision support system or equivalent applications is limited to read only operations. This can limit the range of procedures that decision support system applications can perform.

SUMMARY

Therefore it is an object of this invention to provide a data processing system that includes redundant storage of data and that enables access to the data by multiple processes.

Another object of this invention is to provide a data processing system that stores a data base on redundant storage devices and that enables decision support system applications to run concurrently with on-line transaction processing applications.

Still another object of this invention is to provide a data processing system that stores a data base on redundant storage devices and that enables the system to run on-line transaction processing applications concurrently with decision support system applications having the capability of altering data stored in a disk storage device.

In accordance with one aspect of this invention, a communications link interconnects first and second data processing systems, each being capable of independent operation and including a host computer and data storage facility that stores a data collection at predetermined locations in data blocks. During a normal operating mode, the second system mirrors the data in the first system data storage facility. The second system can operate in an independent operating mode by disabling transfers through the communications link. While communications are disabled, the first system records an identification of each data block that it alters in its data storage facility. The second system records an identification of each data block in its data storage means that changes as a result of its operation. When the independent operation of the second system terminates, the communications link reenables transfers. Data blocks with combined recorded identifications are copied from the first to the second system data storage facilities to reestablish the second data processing system data storage facility as a mirror of the first data processing system storage facility.

In accordance with another aspect of this invention, a data network includes a first data processing system with a first host computer and a first data storage facility for processing first application programs. A second data processing system in the network includes a second host computer and a second data storage facility for processing second applications. A communications link interconnects the first and second data processing systems for normal operation whereby the second data storage facility mirrors the first data storage facility by transferring data through the communications link and wherein each of the data storage facilities includes at least one disk storage device characterized by a plurality of tracks and by block transfers having a one-track length. The second system is enabled to process a second application program independently of and concurrently with the operations of the first applications program by disabling transfers through the communications link and enabling the second system to process the second applications programs. The first and second systems record the location of each transfer to a respective data storage facility during the independent operating mode. When the network returns to a normal operating mode, the recordings are combined and thereafter data in each track in the first data storage facility identified by the combined recordings is transferred to the second data storage facility thereby to reestablish the second data storage facility as a mirror of the first data storage facility.

BRIEF DESCRIPTION OF THE DRAWINGS

The appended claims are intended to point out with particularity and to claim distinctly the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
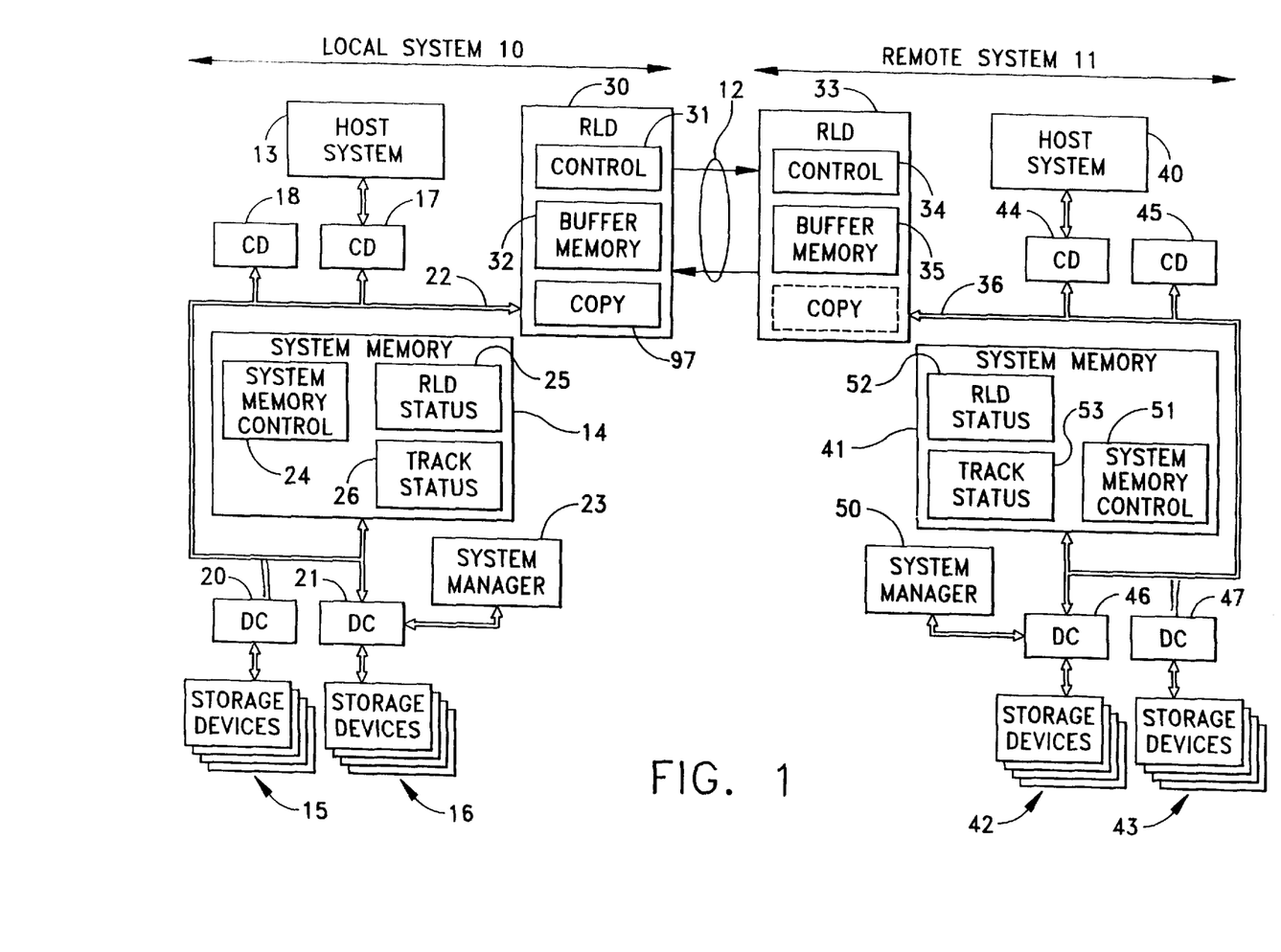
FIG. 1 is a block diagram of interconnected geographically remote data processing systems for operating in accordance with this invention.

FIG. 1 depicts a data processing network comprising two essentially identical or compatible data processing systems that include a local system 10 and a geographically remote system 11. A communications link 12, comprising fiber optic cables or high-speed data transmission lines, interconnects the local system 10 and remote system 11. The physical separation between the local system 10 and the remote system 11 can be up to hundreds of kilometers or more.

The local system 10 comprises major components including a host system 13, including a host processor and a first data storage facility that includes a system memory 14 and sets 15 and 16 of multiple data storage devices or data stores. The system memory 14 can comprise a buffer or cache memory; the storage devices in the pluralities 15 and 16 can comprise disk storage devices, optical storage devices semiconductor storage devices, nonvolatile semi-conductor storage devices and the like. The sets 15 and 16 represent an array of storage devices in any of a variety of known configurations.

A channel director (CD) 17 provides communications between the host system 13 and the system memory 14; device controllers (DC) 20 and 21 provide pathways between the system memory 14 and the storage device pluralities 15 and 16. A bus 22 interconnects the system memory 14, the channel directors 17 and 18 and the device controllers 20 and 21. A system manager 23 enables an operator to transfer information between the various elements of the system, such as a command buffer or system memory control 24, a Remote Link Director (RLD) STATUS block 25 and a TRACK STATUS block 26 that are described in more detail later through one of the device controllers, namely the device controller 21 in FIG. 1. Bus access logic, not shown but known in the art, controls transfers over the bus.

Generally speaking, the local system 10 operates in response to commands from one or more host systems, such as the host system 13, that a connected channel director, such as channel director 17, receives. The channel directors 17 and 18 transfer commands to a command buffer in the system memory 14. The system memory control 24 stores data structures and write requests that the device controllers generate. The device controllers, such as the device controllers 20 or 21, respond by effecting a corresponding operation using the information in the system memory control 24. The selected device controller then initiates a data operation or data access operations, such as a reading operation or operations. Reading operations transfer data from the storage devices to the system memory 14 through a corresponding device controller and subsequently transfer data from the system memory 14 to the corresponding channel director, such as channel director 17 when the host system 13 initiates the data reading operation.

The local system 10 in FIG. 1 additionally includes an RLD 30 for controlling transfers of data between the local system 10 and the remote system 11 over the communications link 12. The major components of the remote link director 30 include a control 31 and a buffer memory 32. The remote link director 30 connects to the system bus 22 and the communications link 12.

The remote system 11 includes a remote link director 33 that connects to the communications link 12 and includes a control 34 and a buffer memory 35. Signals received from the remote link director 33 transfer over a system bus 36, like the system bus 22 or equivalent structure, of the remote system 11. The remote system 11, like the local system 10, includes, as its major components, a host system 40, a system memory 41 and storage device sets or data stores 42 and 43. The sets 42 and 43 represent an array of storage devices configured to mirror the sets 15 and 16. In the same fashion as in the local system 10, the remote system 11 includes channel directors 44 and 45 for connection to host systems. In this particular embodiment, the host system 40 connects to the bus 36 through the channel director 44. Device controllers 46 and 47 provide pathways between the system bus 36 and the storage device sets 42 and 43 respectively. A system manager 50 enables an operator to transfer information between the various elements of the system, such as a control 51, RLD STATUS block 52 and a TRACK STATUS block 53 that are described in more detail later. Bus access logic, not shown but known in the art, controls transfers over the bus.

Each of the local and remote systems 10 and 11 may comprise a Symmetrix integrated cached disk array as manufactured and sold by the assignee of this invention according to known operations as described in Yanai et al., U.S. Pat. No. 5,206,939 issued Apr. 27, 1993. Consequently, the following discussion makes only general references to general operation of such a systems. For purposes of this invention it is sufficient to understand that the remote system 11 normally acts as a mirror of the local system 10 on a volume-by-volume basis and that the volumes can by physical volumes, although logical volumes are preferred. Given the geographical separation between the local and remote systems 10 and 11 in the system in FIG. 1, the system operates with an extremely high degree of reliability, even in the event of a natural disaster. Normally, the local system 10 is the active system while the remote system 11 acts as a mirror. In such systems transfers from the local system 10 to the remote system 11 normally occur in response to a writing command issued by a local host system such as the host system 13. The details of such a transfer are discussed later.

The host system 40, in such an environment, could be limited to performing read operations in order that the remote system 11 exactly mirror the local system 10. Should some catastrophic event prevent any part of the local system 10 from operating, control can be transferred to the remote system 11 through use of the system manager 50 that would disconnect the remote link director 33 and enable the host system 40 to read and write data to the storage device sets 42 and 43. Mirroring remote data facilities are also known in the art; and Symmetrix remote data facilities supplied by the assignee of this invention provide such remote mirroring capabilities.

Unlike the prior art operation of the local and remote systems like those shown in FIG. 1, a system constructed in accordance with this invention enables the remote system 11 (1) to disconnect from the local system 10, (2) to operate as an independent data processing system with the capability of writing data into the storage device sets 42 and 43, (3) to reconnect to the local system 10 and (4) to resynchronize to the local system 10 automatically. This operation requires two types of information, namely: the status of the remote link directories 30 and 33 and the status of each track or corresponding data block in storage devices in each system. The RLD STATUS block 25 records the status of the remote link directory 30. For purposes of this discussion, it is assumed that the RLD STATUS block 25 has one of three values that represent a "DISCONNECT FOR INDEPENDENT ACCESS" or "INDEPENDENT" status, a "RETURNING" status and an "ONGOING" or normal operating mode status. The INDEPENDENT status value indicates that an operator at the local system 10 or the remote system 11 has utilized the corresponding one of the system managers 23 and 50 to terminate communications between the local system 10 and the remote system 11 for a valid reason that does not constitute a condition requiring any corrective action. The RETURNING status means that the system manager 23 or 50 has just reestablished the communications. During intervals characterized by the "INDEPENDENT" and "RETURNING" status, the remote system 11 does not mirror the local system 10. The ONGOING status means that the local system 10 and the remote system 11 are operating normally and are synchronized.

Figure 2A:
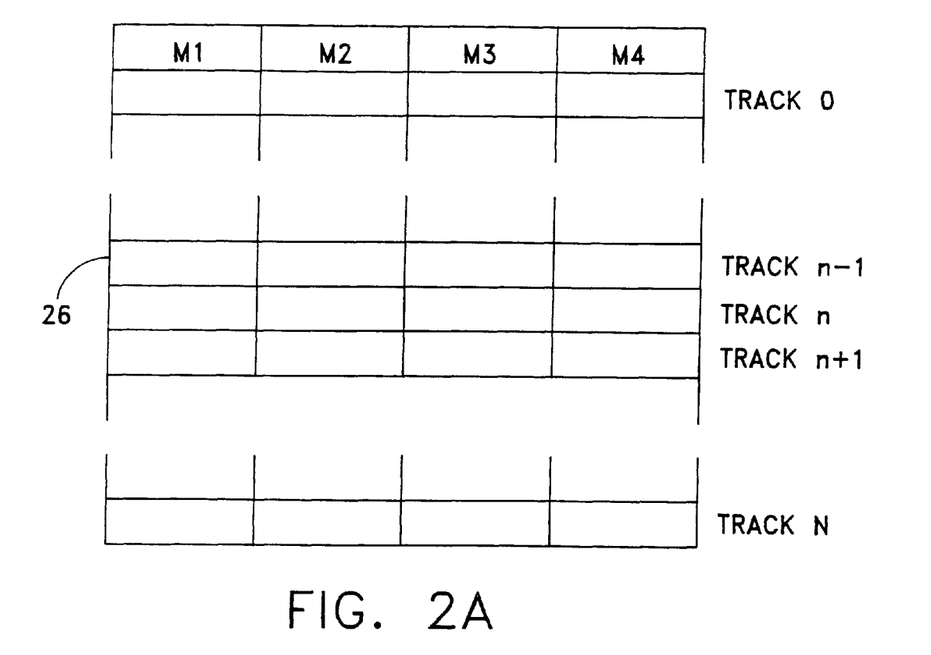
FIGS. 2A and 2B depict the details of TRACK STATUS information that is useful in implementing this invention.

The TRACK STATUS block 26 comprises a bit map with an entry for each track on the storage device sets 15 and 16; the TRACK STATUS block 53 is a bit map with an entry for each track on the storage device sets 42 and 43. FIG. 2A represents the TRACK STATUS block 26 as a matrix in which each row identifies a track in the storage device sets 15 and 16; in FIG. 2B, the TRACK STATUS block 53 has corresponding rows. In both FIGS. 2A and 2B the columns are headed by M1, M2, M3 and M4 that establishes a correspondence between the bit position and the system containing the TRACK STATUS block in a local system 10 and in each of up to three mirroring systems.

It will be apparent that each entry in the blocks 26 and 53 correspond to a data block of a size corresponding to the minimum transfer size. In Symmetrix systems this is typically a track; however, a given track may be divided into multiple blocks or a block might even comprise multiple contiguous tracks. The only change will be the number of rows in each of the blocks 26 and 53, as each row will correspond to one data block.

Figure 2B:
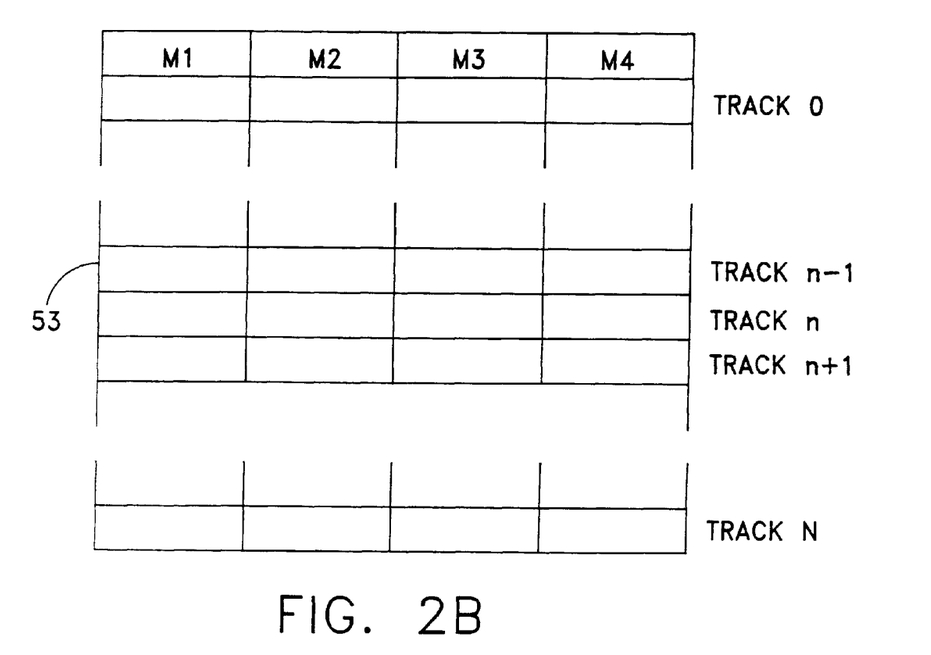

In the system of FIG. 1, only the data columns identified as the M1 and M2 columns in FIG. 2 contain relevant TRACK STATUS data as only one local system 10 and one remote system 11 are present. For any given track the M1 column in FIG. 2A indicates whether the data in the corresponding track in the local system 10 is valid while the M2 column indicates whether the data in the corresponding track in the remote system 11 is valid. Likewise, for any given track the M1 column in FIG. 2B indicates whether the data in the corresponding track in the local system 10 is valid while the M2 column indicates whether the data in the corresponding track in the remote system 11 is valid. In an implementation involving two additional remote systems, the M3 and M4 columns in FIG. 2A would indicate whether the data in the corresponding tracks in the remaining two mirrored systems were valid. Typically and for purposes of this discussion, a "0" indicates a valid data track or block; a "1", an invalid data track or block.

With this as background, it will now be possible to describe the various operations of these components (1) during a normal mirroring mode, (2) during an independent operating mode and (3) during the return to a normal operating mode.

Normal Mirroring Mode

In this disclosed embodiment operating in a normal operating mode the local system 10 is the active system while the remote system 11 functions solely as a mirror. For example, when the system in FIG. 1 accommodates a database, the local system 10 processes all the OLTP applications including those that can effect changes to the data base. For purposes of this description, it is assumed that the host system 13 issues a Channel Control Word (CCW) command including all the necessary parameters from which the system can transfer a data block to or from a particular location in the storage device sets 15 and 16. Other operating systems use other procedures. However, this invention is readily adapted to operate with such systems.

Figure 3:
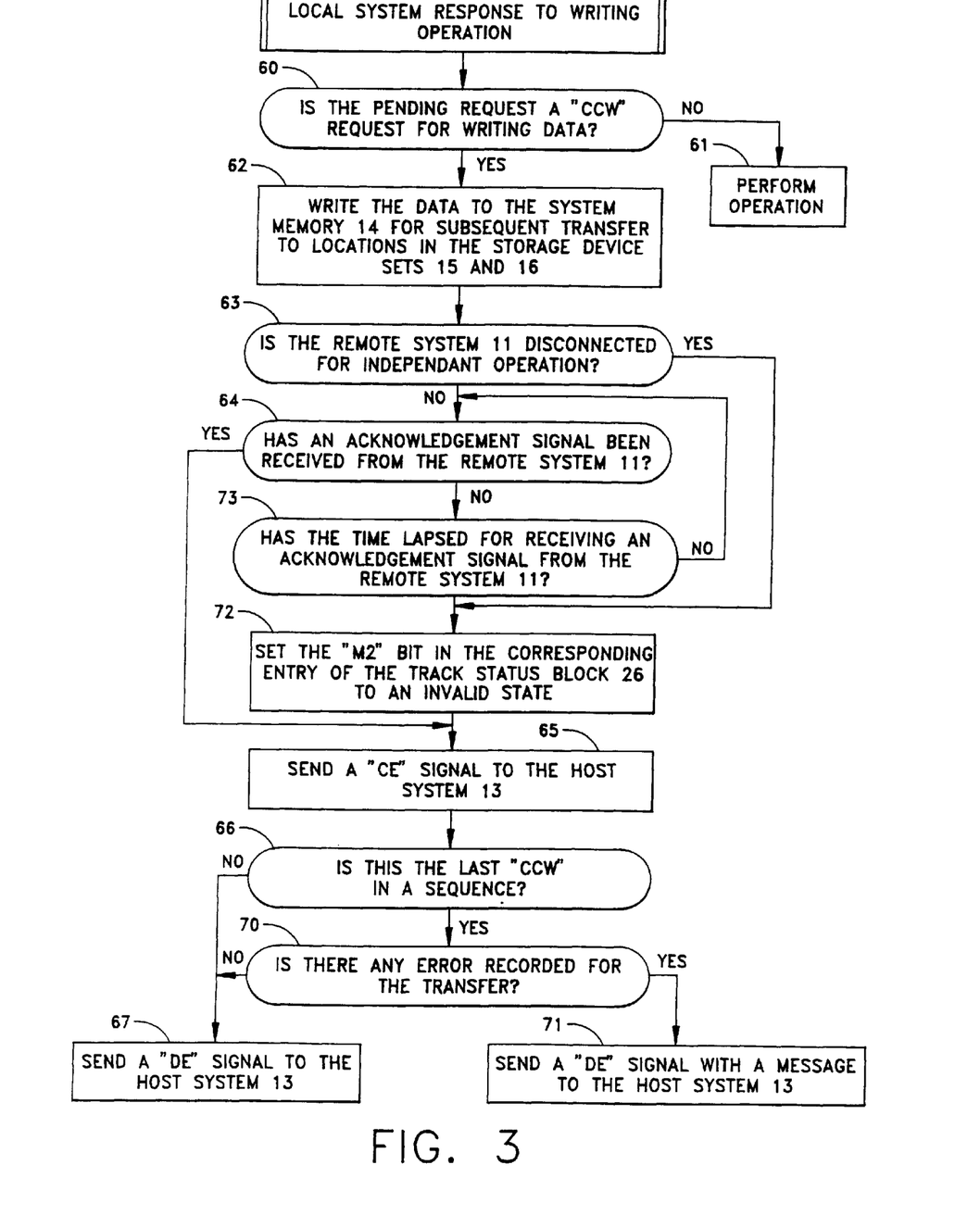
FIG. 3 depicts the process by which a local system as shown in FIG. 1 responds to a writing operation.

When a host system such as the host system 13 in FIG. 1 issues a command, it transfers the CCW command or equivalent to the channel director 17 for transfer to the system memory 14. If the system memory control 24 determines that the pending CCW command will perform an operation other than a writing operation for transferring data to a location in one of the storage device sets 15 or 16, the control 24, in step 60 of FIG. 3, diverts to perform the requested operation in step 61. If the CCW request defines a write operation, control transfers from step 60 to step 62 wherein the information is written into the system memory 14 for subsequent transfer to locations in the storage device sets 15 and 16 in a normal fashion.

During normal mirroring operations, the RLD STATUS block 25 indicates an ONGOING status because the remote system 11 connects to the local system 10 through the remote link directors 30 and 33 and the communications link 12 and because the local system 10 and remote system 11 are synchronized. Consequently control transfers from step 63 in FIG. 3 to step 64 where the system awaits an acknowledgement signal that the remote system 11 has received the data being written to its system memory 41. When this acknowledgement is received under predetermined constraints, control transfers to step 65 wherein the control 24 sends a CE, or Channel End, signal to the host system 13 in step 65. If this is the first or an intermediate CCW command in a sequence, step 66 transfers control to step 67 to send a DE, or Device End, signal to the host system 13. After processing the last CCW command in a sequence step 66 diverts to step 70 to test for any error conditions. If no error has occurred, step 67 sends the DE signal to the host system 13. If an error occurred, control passes to step 71, and the control 24 transfers the DE signal with a message identifying the nature of the error.

Consequently during the normal operating mode any changes the host system 13 makes to the data in the storage device sets 15 and 16 automatically produce corresponding changes in the storage device sets 42 and 43. Moreover in normal operation the storage device sets 42 and 43 or logical volumes therein exactly mirror the corresponding ones of the storage device sets 15 and 16 or logical volumes therein according to configuration information from the system manager 23 and system manager 50. Although the host system 40 is enabled to access data in the storage device sets 42 and 43 in this mode, it can not alter data. It can access data only on a read-only basis. In the normal operating mode and in the context of a data base system, the local system 10 processes all the on-line transaction processing applications by altering the storage device sets 15 and 16 that constitute a primary repository for the data base. The remote system 11 operates only as the mirror of that data base.

Independent Operating Mode

In accordance with this invention, it is possible for the host system 40 in FIG. 1 to operate independently with the capability of writing information to the storage device sets 42 and 43. In the context of a data base system, the host system 40 becomes an independent mechanism for processing decision support system (DSS) applications to produce reports based upon the data base content.

This operation can begin by using the system manager 50 to block communications through the remote link directors 30 and 33 and communications link 12. Well known processes then update the RLD status registers 25 and 52 in the local system 10 and remote system 11, respectively by shifting the status from a "NORMAL" operating mode to "INDEPENDENT" mode and altering the operations within the local system 10 and the remote system 11 differently.

Referring again to FIG. 3, any writing operation or updating operation that now occurs in the local system 10 still alters data in the storage device sets 15 and 16 in step 62 in FIG. 3. However, in step 63 the control 24 determines that the remote system 11 is disconnected for independent operation because the RLD STATUS block contains the "INDEPENDENT" status. In step 72 the control 24 updates the corresponding TRACK STATUS table or block 26 to indicate that the remote system 11 no longer contains valid data in the corresponding track because it is not possible to transfer the new data to the remote system 11. In the system of FIG. 1 the corresponding position in the TRACK STATUS block 26 would be sent to "01" for the M1 and M2 sets. The operation of step 72 also occurs if step 73 indicates that a time interval has elapsed without the receipt of an acknowledgement signal from the remote system 11 during the normal operating mode.

Thus during the independent operating mode the host system 13 continues on an uninterrupted basis to process on-line transaction processing applications or other priority functions on the data base or other data collection in the storage device sets 15 and 16. This occurs with no significant increase in the time required because the only additional requirement is to set the "M2" bit in the corresponding entry of the TRACK STATUS block 26 to an invalid state (e.g., a "1") in step 72 and because the control 24 performs this function.

Figure 4:
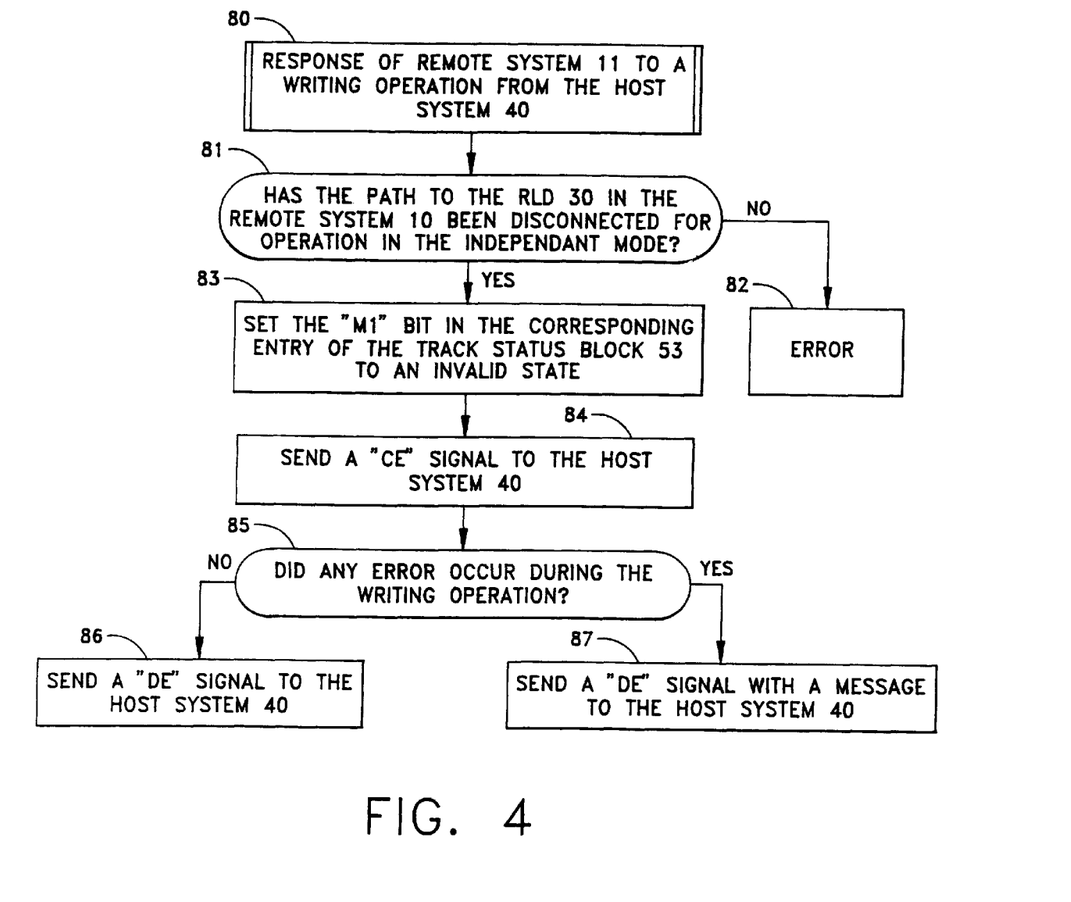
FIG. 4 depicts the process by which a remote system shown in FIG. 1 responds to a writing operation.

Once the communications link 13 has been disabled, the remote system 11 responds according to FIG. 4. In step 80 the host 40 is enabled to issue a CCW command that involves writing data. Step 81 determines that in fact the system is operating in the independent mode. If not, the control 51 diverts its activities to step 82 to initiate an appropriate error procedure. Otherwise in step 83 the control 51 sets the M1 bit in the corresponding entry of the TRACK STATUS block 53 to an invalid state (e.g., the M1 and M2 bits have the value "10") to denote that the specified track in the disk storage sets 42 and 43 no longer mirrors the corresponding track in the storage device sets 15 and 16. In step 84 the control 51 sends a "CE" signal to the host system 40. Step 85 diverts to step 86 to send a DE signal to the host system if no error occurs or to step 87 to send a DE signal with an appropriate message to the host system 40 if an error occurs. Thus, during this independent operating mode, the host system 40 processes decision support system or other applications that may alter the content of the storage device sets 42 and 43. However, step 83 assures that an historical record of those changes is maintained. During this operation the direct support system determines which data to write and has the responsibility for assuming that it does not alter data to be used later in a process.

Figure 5:
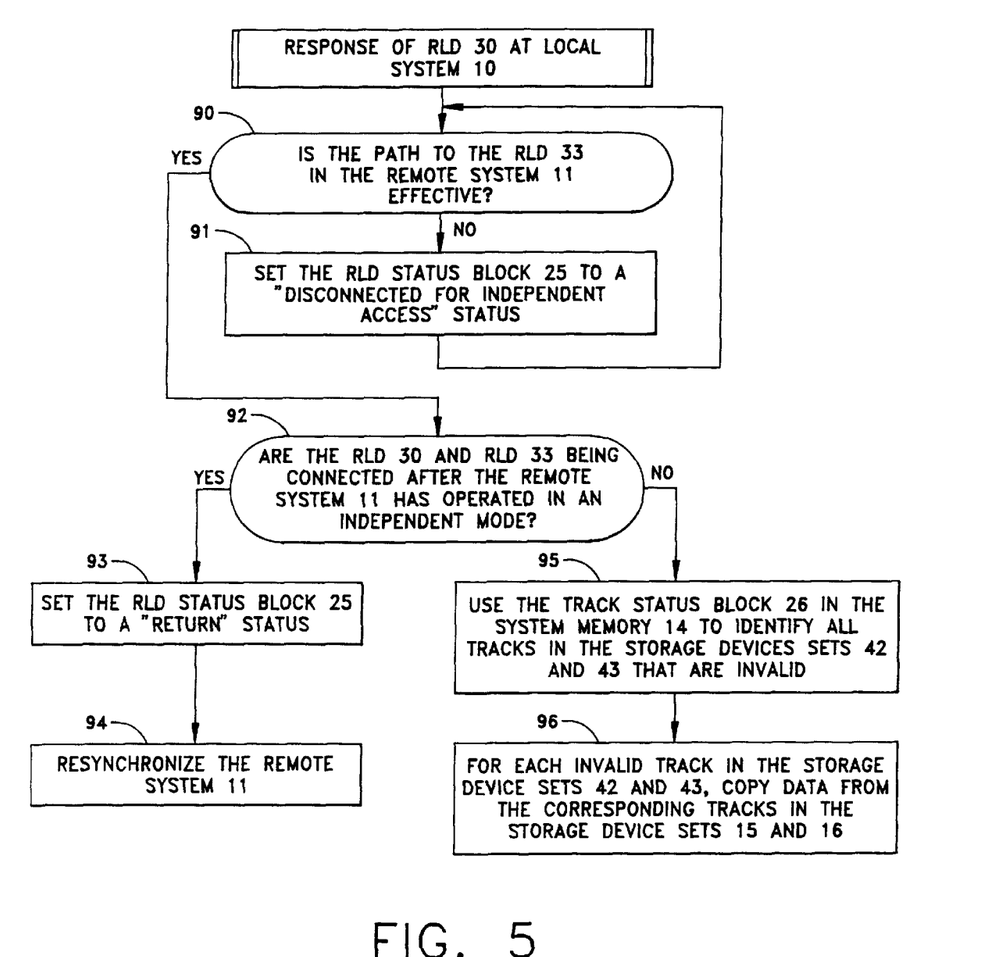
FIG. 5 depicts the operation of a remote link director shown in FIG. 1.

FIG. 5 depicts the pertinent operation of the remote link director 30 at the local system. The control 31 in step 90 determines whether the path through the communications link 12 to the remote link director 33 is effective. If it is not, the control 31 sets the RLD status to the "DISCONNECT FOR INDEPENDENT ACCESS" status referred to above in step 91. Once the path is disabled, the status remains unchanged until a reconnection at the end of the independent operating mode.

Return to Normal Operating Mode

When the processing of decision support system or equivalent applications concludes, the system manager 50 reestablishes the connection through the communications link 12 and reverts the remote system 11 to the normal operating mode. Now any attempt by the host system 40 to write data will cause step 81 in FIG. 4 to divert to the error procedure 82.

Simultaneously the control 31 shifts control from step 90 in FIG. 5 to step 92 and determines whether the connection is being made after the remote system has operated in an independent mode based upon information contained in the RLD STATUS block 25 or any alternate location within the remote link director 30. If it is, the control 31 sets the RLD STATUS block 25 to a "RETURN" status in step 93 to indicate a return to the normal operating mode during which resynchronization will occur. Then in step 94 the control 31 resynchronizes the local system 10 and remote system 11. Generally, the control 31 retrieves the TRACK STATUS block 53 from the remote system 11 and effectively identifies all the tracks in the storage device sets 42 and 43 that have invalid tracks either because the host system 13 altered tracks in the data storage sets 15 and 16 or because the host system 40 altered tracks in the data storage sets 42 and 43 during the independent operating mode. A more detailed description of the resynchronizing procedure of step 94 appears below.

Still referring to FIG. 5, if the two remote link directors 30 and 33 have disconnected for other reasons, then step 92 transfers to step 95. The control 31 uses only the status block 26 to identify all of the tracks in the storage device sets 42 and 43 that are invalid. This operation, for example, could occur if a particular storage device in the one of the storage device sets 42 and 43 became inoperable for any period of time. In step 96 a copy program 97 in the RLD 30 in FIG. 1 transfers data from identified tracks in the storage device sets 15 and 16 to corresponding tracks in the storage device sets 42 and 43.

Figure 6:
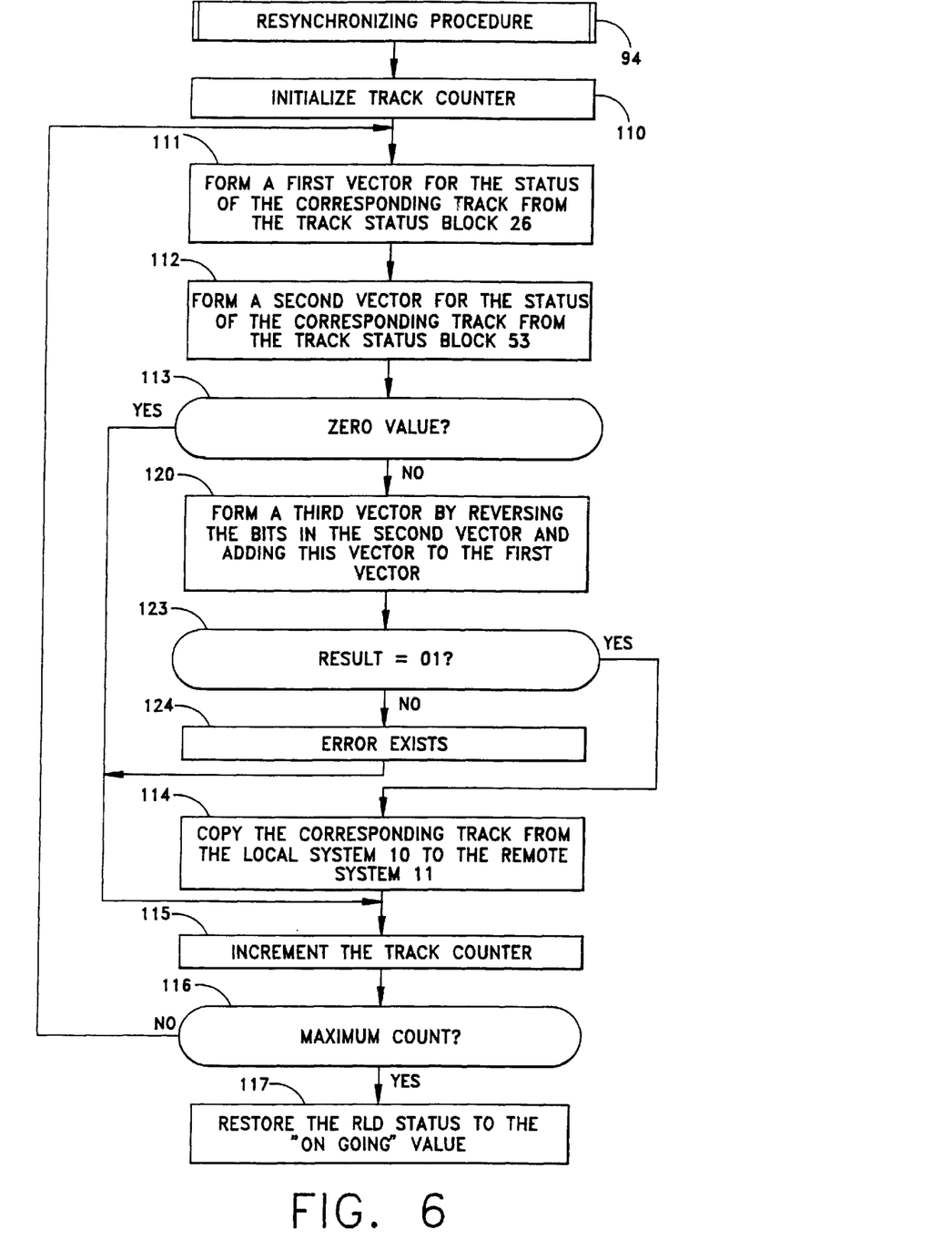
FIG. 6 is a more detailed sequence of the remote link director shown in FIG. 5.
Figure 7:
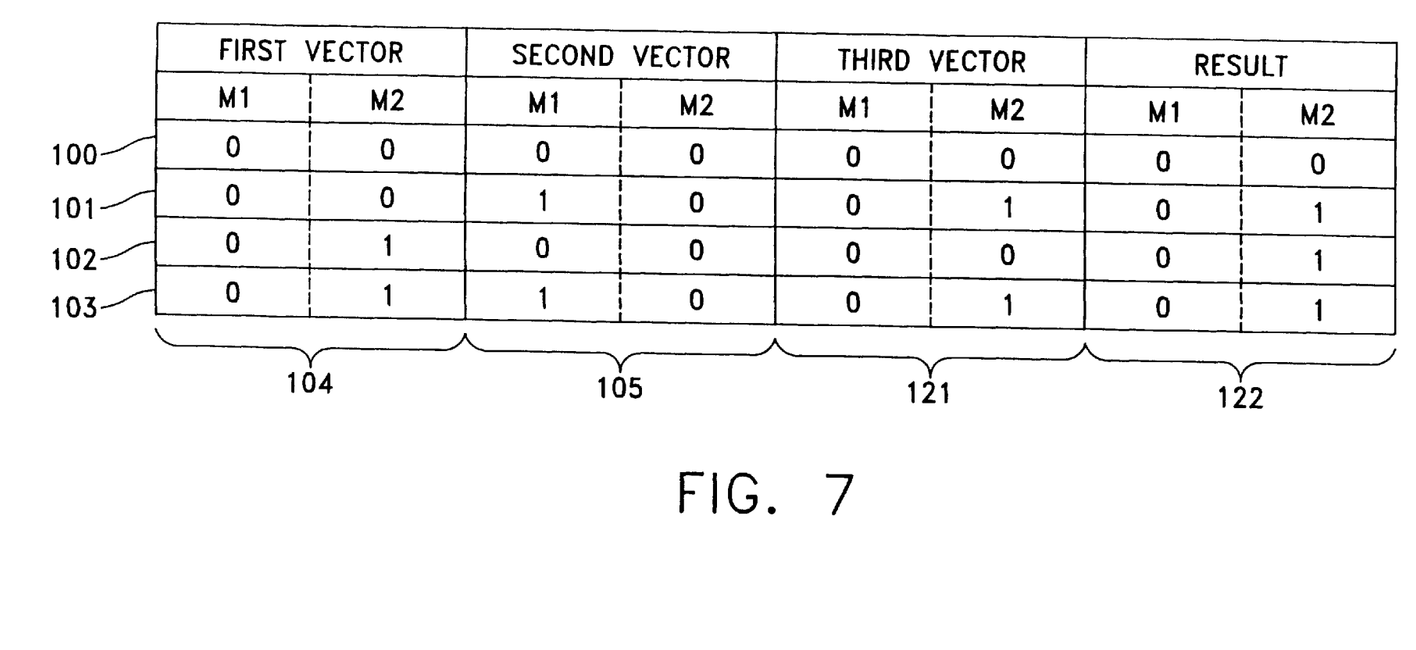
FIG. 7 is a diagram that is useful in understanding this invention and the operation of FIG. 6.

In one embodiment of this invention, the control 31 performs the resynchronization process of step 94 according to a procedure of FIG. 6. Before discussing this procedure in detail, it will be helpful to understand that at the end of the independent operating mode the collection of bits assigned to a specific track in the TRACK STATUS blocks 26 and 53 and assigned to the local system 10 and mirroring remote system 11 can define only one of four valid bit patterns. In FIG. 7, rows 100, 101, 102 and 103 define these four valid bit patterns of the TRACK STATUS blocks for a given track. Column 104 shows the values of the M1 and M2 bits in the TRACK STATUS block 26 for that track; column 105, the values of the M1 and M2 bits in the TRACK STATUS block 53 for the corresponding track.

Still referring to FIG. 7, if neither the host system 10 nor the host system 40 alters information in a track during the independent operating mode, the corresponding M1 and M2 bits in each of the TRACK STATUS blocks 26 and 53 will be "0" as shown in row 100 and columns 104 and 105. If only the host system 40 alters information in a track, the values of the M1 and M2 bits will be "10" as shown in row 101 at column 105; the M1 and M2 bits in the TRACK STATUS block 26 remain "00". In the context of the independent operating mode this means that the data in the track of the storage device sets 42 and 43 is altered, but valid with respect to the procedure being executed by the host system 40. If only the host system 13 alters information in a track, the M1 and M2 bits in the TRACK STATUS block 26 become "01" while the corresponding bits in the TRACK STATUS block 53 remain "00" as shown at row 102 under columns 104 and 105 respectively. The fourth valid bit pattern results when both the host system 13 and the host system 40 alter data in a track. In that event, as shown in row 103, the bit patterns in the TRACK STATUS blocks 26 and 53 are "01" and "10" respectively.

As previously indicated, FIG. 6 depicts the process by which in step 94 in FIG. 5 the control 31 in FIG. 1 uses these bit patterns to resynchronize the systems. This process is iterative in nature and under the control of a loop controller in the form of a track counter (not shown, but located within the RLD 30) that the process initializes in step 110. In step 111 the control 31 forms a first vector corresponding to the data located in column 104 of FIG. 7 from the TRACK STATUS block 26. In step 112 a similar action forms a second vector corresponding to the data located in column 105 of FIG. 7 from the TRACK STATUS block 53.

In step 113, the control 31 determines if the concatenated first and second vectors has a "ZERO" value, as would occur if the vectors corresponded to the values in row 100 of FIG. 7 indicating that no change occurred to the track in either of the storage devices in sets 15 and 16 or sets 42 and 43. If this occurs, control passes to a loop control comprising step 115 that increments the track counter to point to a next track in sequence. In step 116 the control determines if all the tracks have been tested by comparing the track counter contents to a maximum value. If more tracks need to be examined, control passes back to step 111. Otherwise the resynchronizing process is complete, and step 116 transfers control to step 117 to restore the status in the RLD STATUS block to the "ONGOING" value indicating a return to normal mirroring operations.

If the concatenated first and second vectors do not have a "ZERO" value, the control 31 transfers from step 113 to step 120 to form a third vector by reversing the bits in the second vector and summing the first and third vectors. FIG. 7 depicts the effect of the bit reversal, or swap, in column 121. Such swapping procedures are well known. If the swap did not occur in step 120, the M1 bit in the TRACK STATUS register 26 could be set erroneously to an invalid value that would effectively delete valid data from the data base.

Column 122 depicts the result provided in step 120 by performing a logical inclusive "OR" operation on the first vector in column 104 and the third vector in column 121. Rows 101, 102 and 103 show that the result in each case is "01". With reference to the local system 10, this value indicates that the track in the local system 10 is valid while the corresponding track in the remote system 11 is no longer valid with respect to the data in the data storage sets 15 and 16.

As will now be shown, any other value represents an error condition. A "1" in the M1 bit in column 104 indicates that the data in the local system 10 is invalid; consequently, no action should be taken to transfer this data to the remote system 11. Similarly, a "1" in the M2 bit position in column 105 indicates that the data in the remote system 11 is invalid. This occurs only if some fault exists with respect to a track; consequently, no action to be taken to transfer any data to this track until after the fault is cleared.

In step 123 the control 31 determines the value of the result. If the value is other than "01", then, as previously indicated, an error exists. The control 31 terminates any further processing with respect to the particular track by noting the error in step 124 through an error condition detection scheme or interrupt handler and then transfers to step 113 in the loop control.

If the result for the status of a track in step 120 is "01", the tracks need to be resynchronized. Step 123 then transfers to step 114 to copy the track from the local system 10 to the remote system 11. Next the system transfers operations to step 115 in the loop control.

When step 116 shifts control to step 117, the resynchronizing process of FIG. 6 has tested the bit patterns for each track and copied only those that are needed to resynchronize the data. This operation occurs concurrently with normal operations so that during the process any changes the host system 13 makes to the data also produces a change in the remote system 11. If the host system 13 alters a track during the process, the new data transfers to the remote system 11 conventionally. If the host system 13 alters the track before it is processed by the resynchronizing process and the M1 and M2 bits in the TRACK STATUS block 53 still remain at a "10" value, such as shown at rows 101 and 103 of FIG. 7, the copy program 97 will merely recopy the data from the local system 10 to the remote system 11.

As previously indicated it is possible to modify the network shown in FIG. 1 by adding a third and even a fourth system interconnected through corresponding communications links. The interconnection of three systems could then provide a first system like the local system 10 dedicated to process OLTP or other priority applications, a second remote system like the remote system 11 operating as a mirror and as a mechanism for performing decision support system or other applications, and a third system that always operates to mirror the data in the first system. Alternatively, the third system could also be adapted for running other applications in an independent operating mode.

The general approach of redundancy and dedicated OLTP or other priority processing of this invention is particularly effective because the percentage of operations that alter the data on a disk rarely involve the system for a majority of its time. Normally, significantly less then half of all disk operations involve writing operations or data changes. Further the remote system can operate as a decision support system because generally such programs operate with respect to a snapshot of the data base taken at a particular time and because an individual application normally requires only a very short time. In this particular embodiment that snapshot represents the data base at the instant the system manager 50 disables transfers through the communications link 12.

When implemented as described above, the network shown in FIG. 1 meets the objectives of this invention. Given the relatively short times required to process decision support systems, the local system 10 and the remote system 11 operate in a mirrored configuration for the vast majority of time to provide redundancy. However when it is necessary to obtain a report or answer to a query, the operation occurs simultaneously with the continued operations within the local system 10 and without any intervention by the local system 10 that could adversely affect its operating characteristics. Moreover immediately upon completion of the report or query, local and remote systems resynchronize to reestablish a mirror relationship. Typically the number of tracks that need to be updated will be minimal, so that the time required to resynchronize the system after running decision support system applications will be minimal. Moreover the copy program 97 in FIG. 1 by virtue of its being located in the remote link director 30 performs this resynchronization independently of the on-line transaction processing or other priority application.

This invention has been disclosed in terms of an embodiment based upon the architecture of the assignees Symmetrix data facilities. Specific implementations are therefore system specific. Discussion of other particular implementations have not been incorporated. Rather the discussion has been directed to how these different systems interact for implementing the multiple access concept of this invention and provide sufficient information for enabling an implementation on the data processing systems of other manufacturers.

In this specific embodiment, data transfers occur on a track-by-track basis with the monitoring of the status of those tracks in the TRACK STATUS blocks 26 and 53 of FIGS. 1, 2A and 2B. Other embodiments might operate by transferring data blocks of a longer or shorter length than is carried on a single track. In such an implementation, the TRACK STATUS blocks would be modified to identify each such block individually. Moreover, the system in FIG. 1 depicts a single host system 13 in the local system 10 and a single host system 40 in the remote system 11. Other systems like the remote system 11 could connect to the local system 10 by separate remote link detectors and communications links. In such a configuration, each remote system could mirror the entirety of the data or portions of the data in the device storage sets 15 and 16. In other embodiments, two or three systems, like the local system 10 could connect to the remote system 11 by means of separate remote link directors and communications links whereby the capacity of the disk storage sets 42 and 43 would be increased to equal all the disk storage capacity to be mirrored collectively in the remaining systems. It will be apparent other host systems could be added to the configuration in FIG. 1 as by being connected to the channel director 17 or other channel directors, such as channel director 18. It will be apparent that many other modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A method for operating first and second data processing systems interconnected by a communications link, each system being capable of independent operation and including a host computer and a data storage facility that stores data at predetermined locations in data blocks, the second system, during a normal operating mode, constituting a mirror for the data in the data storage facility of the first system, said method comprising:

(A) enabling an independent operating mode of each of the first and second systems by disabling transfers through the communications link and enabling the independent operation of each of the first and second systems, (B) recording in the data storage means of the first system an identification of each data block that changes as a result of the operation of the first system, (C) recording in the data storage means of the second system an identification of each data block that changes as a result of the operation of the second system, (D) enabling the communications link upon completion of the independent operations thereby to return to the normal operating mode, and (E) thereafter, and independently of the first data system:
  (i) combining the recorded identifications to identify all the data blocks that were changed in the data storage means of the first and second systems, and
    (a) copying from the data storage facility in the first system to the data storage facility in the second system the data blocks corresponding to the combined recorded identifications thereby to reestablish the data storage facility in the second data processing system as a mirror of the data storage facility in the first data processing system.

2. A method as recited in claim 1 wherein said copying occurs concurrently with operations of the first data processing system after the normal operating mode is established.

3. A method as recited in claim 2 wherein the second system includes, for each data block, a data block status that includes a first field indicating the validity of the data block in the first system data storage facility and a second field indicating the validity of the data block in the second system data storage facility and wherein the recording of data block identifications in the second system includes responding to each change in a data block produced by said second system by setting the first field in the corresponding data block validity status to an invalid data value.

4. A method as recited in claim 3 wherein said combining of the recorded identifications includes the step of retrieving the data block validity status from the second system.

5. A method as recited in claim 3 wherein the first system maintains data block validity status that, for each data block, includes a first field indicating the validity of the data block in the first system data storage facility and a second field indicating the validity of the data block in the second system data storage facility and wherein the recording of data block identifications in the first system includes responding to each change in a data block produced by the first system by setting the second field in the corresponding data block validity status to an invalid data value.

6. A method as recited in claim 5 wherein said combining of the recorded identifications includes retrieving the data block validity status from the second system, combining the data block validity status from the first and second systems to identify all data blocks in the second system that fail to mirror corresponding blocks in the first system, said copying thereafter copying each of the identified data blocks from the data storage facility of the first system to the data storage facility of the second system.

7. A method as recited in claim 6 wherein each of the data block status fields comprises a single bit having first and second states when the corresponding data is valid and invalid, respectively, and wherein said combining step includes an exchange of the fields for each data block status from the second system and the combination of the second fields in a logical OR operation thereby to identify those data blocks that had been changed by the first system and by the second system during the independent operation.

8. In a data network including a first data processing system with a first host computer and a first data storage facility for processing first application programs and a second data processing system with a second host computer and a second data storage facility for processing second application programs and a communications link for interconnecting the first and second data processing systems during a normal operating mode wherein the second data storage facility mirrors data in the first data storage facility by transferring data through the communications link and wherein each of the data storage facilities includes at least one disk storage device characterized by a plurality of tracks and by block data transfers having a one-track length, the improvement of a method whereby the first and second systems are enabled to process, respectively, the first and second application programs independently and concurrently, said method comprising the steps of:

(A) enabling an independent operating mode by disabling transfers through the communications link and enabling the second system to process the second application programs while the first system processes first application programs without interruption, (B) recording, in each of the first and second data storage facilities and during the independent operating mode, an identification of each track in the respective data storage facility altered by a respective one of the first and second application programs, (C) enabling the communications link thereby to reestablish a normal operating mode, and (D) thereafter and independently of the operations of the first data processing system:
  (i) combining in the first data storage facility, upon return to a normal operating mode, the recordings of each transfer to a track thereby to identify all the tracks that were changed in the data storage facilities of the first and second data processing systems, and
    (a) copying to each track in the second data storage facility the data from each track of the first storage facility identified by the combined recordings thereby to reestablish the data in the second data storage facility as a mirror of the data in a first data storage facility.

9. A method as recited in claim 8 wherein the first and second systems store a data base and a mirror thereof, the first application programs include on-line transaction processing programs and the second application programs include decision support system programs, said copying during the normal operating mode occurring concurrently with the operation of the on-line transaction processing programs in the first system.

10. A method as recited in claim 8 wherein the second system maintains, for each track in the second data storage facility, track status defined by a first field indicating the validity of the track in the first data storage facility and a second field indicating the validity of the corresponding track in the second data storage facility and wherein the recording of track identifications in the second system includes changing the first field in the corresponding track status to an invalid data value in response to a writing operation by a decision support system application program.

11. A method as recited in claim 10 wherein said combining includes the step of retrieving the track status from the second system through the communications link when the first and second systems return to the normal operating mode after operating independently.

12. A method as recited in claim 10 wherein the first system maintains, for each track in the first data storage facility, track status defined by a first field indicating the validity of the track in the first system data storage facility and a second field indicating the validity of the corresponding track in the second system data storage facility and wherein the recording of track identifications in the first system includes responding to each change in a track produced by an on-line transaction processing application program by setting the second field in the track status for the corresponding track to an invalid data value.

13. A method as recited in claim 12 wherein said combining includes retrieving the track status from the second system, combining the track status from the first and second systems to identify all tracks in the second system that fail to mirror corresponding tracks in the first system, and said copying copies each of the identified tracks from the first data storage facility to the second data storage facility.

14. A method as recited in claim 13 wherein each of the data block status fields comprises a single bit having first and second states when the corresponding data is valid and invalid, respectively, and wherein said combining of track status includes an exchange of the fields for each data block status from the second system and the combination of the second fields in a logical OR operation thereby to identify those data blocks that had been changed by the first system and by the second system during the independent operation.

15. In a data processing network including first and second data processing systems interconnected by a communications link, each system being capable of independent operation and including a host computer and a data storage facility that stores data at predetermined locations in data blocks, said second system, during a normal operating mode, operating to mirror the data in said data storage facility of said first system, the improvement of:

(A) mode control means for enabling switching between the normal operating mode and an independent operating mode of each of said first and second systems by disabling transfers through said communications link, said first and second systems operating on data in their respective data storage means independently of the other system, (B) first recording means in said data storage facility of said first system for recording an identification of each data block in said data storage means of said first system that changes as a result of the operation of said first system, (C) second recording means in said data storage facility of said second system for recording, during the independent operating mode of said second system, an identification of each data block in said data storage means of said second system that changes as a result of the operation of said second system, (D) combining means operable independently of said first data processing system host computer for combining the recorded identifications to identify all the data blocks that were changed in the data storage means of the first and second systems in response to said mode control means shifting operations back to the normal operating mode, and (E) copying means operable independently of and in parallel with the first data processing system for copying data from said data storage facility in said first system to the data storage facility in said second system the data blocks corresponding to the combined recorded identifications thereby to establish said data storage facility in said second data processing system as a mirror of said data storage facility in said first data processing system.

16. A network as recited in claim 15 wherein said second recording means includes, for each data block, a data block status that includes a first field indicating the validity of said data block in said first system data storage facility and a second field indicating the validity of the data block in said second system data storage facility and means responsive to each change in a data block produced by said second system by setting said first field in said corresponding data block validity status to an invalid data value.

17. A network as recited in claim 16 wherein said combining means includes means for retrieving said data block validity status from said second system.

18. A network as recited in claim 16 wherein said first recording means includes, for each data block, a data block status register means defined by a first field indicating the validity of the data block in said first system data storage facility and a second field indicating the validity of the data block in said second system data storage facility and means responsive to each change in a data block produced by said first system by setting said second field in said corresponding data block validity status to an invalid value.

19. A network as recited in claim 18 wherein said combining means includes means for retrieving said data block validity status registers from said second system and means for combining said data in said corresponding data block status registers from said first and second systems to identify all data blocks in said second system that fail to mirror corresponding blocks in said first system, said copying means thereafter copying each of said identified data blocks from said data storage facility of said first system to said data storage facility of said second system.

20. A network as recited in claim 19 wherein each of said data block status register fields comprises a single bit having first and second states when the corresponding data is valid and invalid, respectively, and wherein said combining means includes means for exchanging the bit positions of the first and second fields for each data block status register from said second system and means for combining said second fields in a logical OR operation thereby to identify those data blocks that had been changed by said first system and by said second system during the independent operation.

21. In a data network including a first data processing system with a first host computer and a first data storage facility for processing first application programs and a second data processing system with a second host computer and a second data storage facility for processing second application programs and a communications link for interconnecting said first and second data processing systems during a normal operating mode wherein said second data storage processing system mirrors said first data storage facility by transferring data through said communications link and wherein each of said data storage facilities includes at least one disk storage device characterized by a plurality of tracks and by block data transfers having a one-track length, the improvement of means for enabling said first and second systems to process, respectively, the first and second application programs independently and concurrently, said means comprising:

(A) mode control means for enabling switching between the normal operating mode and an independent operating mode by disabling transfers through said communications link and enabling said second system to process the second application programs while the first system processes the first application programs independently and without interruption, (B) status register means, in each of said first and second data storage facilities, for recording each transfer to a track in a respective data storage facility during the independent operating mode produced the respective one of the first and second application programs, (C) means in said first data storage facility responsive to said mode control means reestablishing a normal operating mode for combining the recordings of each transfer from said status register means in said first and second data storage facilities independently of the operations of the first application programs, and (D) copying means in said first data storage facility for thereafter copying to each track in said second data storage facility the data from each track of said first storage facility identified by said combining means independently of and in parallel with the operations of the first application programs.

22. A network as recited in claim 21 wherein said first and second systems store a data base, the first application programs include on-line transaction processing programs and the second application programs include decision support system programs and wherein said copying means in said data storage facility operates concurrently with the operation of the on-line transaction processing programs in said first system.

23. A network as recited in claim 21 wherein said status register means in said second data storage facility includes a track status register for each track in said second data storage facility, each said track status register having a first field indicating the validity of the track in said first data storage facility and a second field indicating the validity of the corresponding track in said second data storage facility and wherein said status register means includes means for changing said first field to a value indicating invalid data on a track in response to a writing operation by a decision support system application program.

24. A network as recited in claim 23 wherein said combining means includes means for retrieving the contents of said track status registers from said second system through said communications link when said first and second systems return to normal operation after operating independently.

25. A network as recited in claim 23 wherein said status register means in said first data storage facility includes a track status register including a first field indicating the validity of data in a corresponding track in said first system data storage facility and a second field indicating the validity of the data in the corresponding track in said second system data storage facility and wherein said status register means includes means responsive to a change in the data of a track produced by an on-line transaction processing application program for setting said second field in said corresponding track status register to a value indicating invalid data.

26. A network as recited in claim 25 wherein said combining means includes means for retrieving the contents of said track status register means from said second data storage facility through said communications link and means for combining said track status from said first and second track status registers to identify all tracks in said second data storage facility that fail to mirror corresponding tracks in said first data storage facility, said copying means copying data in each of the identified tracks from said first data storage facility to corresponding tracks in said second data storage facility.

27. A network as recited in claim 26 wherein each of said track status register fields comprises a single bit having first and second states when the corresponding data is valid and invalid, respectively, said combining means including means for exchanging said fields for each track status register retrieved from said second data storage facility and logical means for combining the second fields in corresponding track status registers in a logical OR operation thereby to identify those tracks in which data has been changed by said first system and by said second system during the independent operating mode.

* * * * *

UNITED STATES PATENT AND TRADEMARK OFFICE
CERTIFICATE OF CORRECTION

PATENT NO.    : 6,092,066
DATED         : July 18, 2000
INVENTOR(S)   : Yuval Ofek It is certified that error appears in the above-identified patent and that said Letters Patent is hereby corrected as shown below:

Column 13,
Line 26, after "independently" insert -- operations in --

Column 16,
Line 7, after "with" insert -- operations in --

Signed and Sealed this

Twenty-ninth Day of October, 2002

Attest:

Attesting Officer

JAMES E. ROGAN
Director of the United States Patent and Trademark Office